2,930,731

BIS[β-(ORTHO-HYDROCARBONOXYPHENYL)ISO-PROPYL]AMINES

Richard V. Heinzelmann, Kalamazoo, Mich., assignor to The Upjohn Company, Kalamazoo, Mich., a corporation of Michigan No Drawing. Application April 8, 1952
Serial No. 281,219

4 Claims. (Cl. 167—52)

This invention relates to the diastereoisomeric bis [β-(orthohydrocarbonoxyphenyl)isopropyl]amines represented by the formula:

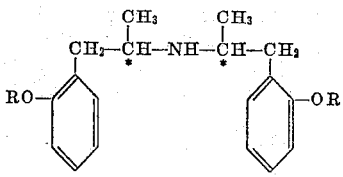

wherein R is a hydrocarbon radical having from one to seven carbon atoms, their salts with acids and to their preparation.

The amines of this invention are basic, mobile liquids which form salts equally well with organic and inorganic acids such as sulfuric, hydrochloric, nitric, lactic, glycolic, acetylsalicylic, nicotinic, acetic and the like acids. Due to the presence in the amine molecule of two identical carbon atoms, indicated by the asterisks in the formula presented above, racemic and meso modifications exist (Gilman, Organic Chemistry, 2nd edition, John Wiley and Sons Inc., New York, vol. I, pages 232 and 233). These diastereoisomeric modifications form salts with acids as mentioned above, with the melting point and solubilities of any specific salt of one modification of a particular amine differing from the melting point and solubilities of the same salt of the other diastereoisomer.

The products of this invention are useful in therapy, as anesthetics, bronchodilators, antispasmodic and antisecretory agents, differing from previously known amines in their wide range of activities as well as their potency. They are particularly useful in anesthesia not only because of their effectiveness and favorable therapeutic ratio but because in addition to these properties they are so stable that their aqueous solutions can be sterilized by heating without any resultant hydrolysis. In this respect they differ substantially from those anesthetics which are esters or halogenated compounds.

The diastereoisomeric amines of this invention can be prepared, but not necessarily in equal amounts, by contacting a solution of an ortho-hydrocarbonoxyphenyl acetone and either ammonia or an ortho-hydrocarbonoxyphenylisopropylamine in a suitable solvent with hydrogen in the presence of a hydrogenation catalyst under suitable conditions of temperature and pressure until the absorption of hydrogen, as shown by the drop in hydrogen pressure, has stopped. The catalyst and solvent are then removed and the residual oil fractionally distilled under reduced pressure; the portion distilling above about 200 degrees centigrade at a pressure of about three millimeters of mercury being a mixture of the diastereoisomeric bis[β-(ortho-hydrocarbonoxyphenyl)isopropyl] amines. Alternatively, after the removal of the catalyst the residue can be acidified and the desired products separated from unreacted starting material and other impurities by crystallization from suitable solvents among which are water, methanol, ethanol, isopropanol and the like.

The temperature and hydrogen pressure used is dependent in part upon the particular hydrogenation catalyst employed. Most common hydrogenation catalysts can be used such as Raney nickel, platinum oxide, palladium and copper chromite catalysts with platinum oxide or Raney nickel being preferred. Temperatures of between about 25 to about 35 degrees centigrade and hydrogen pressures of between 45 to about 60 pounds per square inch are preferred although higher or lower temperatures and pressures can be employed. Suitable solvents include those which are neutral and resist hydrogenation under the reaction conditions employed such as esters, lower alcohols, hydrocarbons and the like with methanol being a preferred solvent. It is preferred to use a slight excess of ammonia over the calculated quantity necessary to convert an ortho-hydrocarbonoxyphenyl acetone to a bis[β - (ortho - hydrocarbonoxyphenyl)isopropyl]amine, but a large excess of ammonia is to be avoided as when a large excess is used an ortho-hydrocarbonoxyphenyliso-propylamine is the predominating reaction product. On the other hand an orthohydrocarbonoxyphenyl acetone and an ortho-hydrocarbonoxyphenylisopropylamine are preferably present in equi-molecular proportions in the solution to be subjected to hydrogenation.

Mixtures of the diastereoisomeric amines of this invention can be separated into pure individual isomers by converting a mixture containing both isomers to a suitable salt and fractionally crystallizing the salts from a suitable solvent such as water or isopropanol, according to known methods until pure isomer-free products are obtained. However this procedure is not particularly satisfactory in the present instance unless only a small proportion of the contaminating isomer is present. A preferred procedure is based on the unexpected discovery that one of the diastereoisomers forms a complex with many alcohols which is relatively insoluble in an excess of the alcohol, particularly at temperatures below room temperatures, while the complex with the other isomer, if it is formed, is much more soluble and does not crystallize when an excess of the alcohol is present. Among the alcohols which can be used in this method for the separation of the isomeric amines of this invention are methanol, ethanol, propanol, isopropanol, ethylene glycol, propylene glycol, cyclohexanol and diethylene glycol mono ethyl ether ("Carbitol"). In carrying out the separation of the isomeric amines by this method a mixture of the isomeric amines is dissolved in a warm alcohol, for example methanol, and the solution cooled to below room temperature. The solid complex which is formed between one of the isomers precipitates from the solution and is collected by filtration or like procedure. This solid complex remains a solid only so long as it is damp with the alcohol used, removal of the alcohol as by exposure to air or heating causes liquefication, the solvent free liquid amine being obtained. The mother liquor remaining after removal of the solid upon concentration and cooling will often deposit a second crop of the crystalline complex which can be collected and combined with the first crop. Complete removal of the solvent yields the other diastereoisomer in purified condition. This preferred procedure is particularly useful in the separation of the diastereoisomeric bis[β-(orthomethoxyphenyl)isopropyl]amines. A sufficiently complete separation of the two isomers is obtained so that further purification, if necessary or desired, can be accomplished readily and without much loss of material by forming a suitable salt of the amine and crystallizing the salt from water, ethanol, isopropanol or other suitable solvent. For some purposes the separation of isomers is not necessary and the mixture of isomers obtained from the reaction after removal of unreacted starting material and other impurities is suitable for use.

The following examples, which illustrate the products and process of this invention, are subject to variations as will be apparent to those skilled in the art to which this invention pertains.

PREPARATION 1
o-Benzyloxyzenzaldehyde

To an ethanolic solution of sodium ethoxide prepared from 23 grams (1.0 mole) of sodium and 500 milliliters of absolute ethanol was added a rapid drop-wise rate 122 grams (1.0 mole) of salicylaldehyde. The mixture was stirred and heated under reflux for four hours after which 126 grams (1.0 mole) of benzyl chloride was added in a fine stream. Stirring and heating were continued for about forty more hours. The sodium chloride which had precipitated was removed by filtration and the solvent was removed by distillation under reduced pressure. The residual oil was dissolved in 250 milliliters of ether, filtered to remove an additional amount of sodium chloride, and stirred vigorously for about one hour with saturated sodium carbonate solution. The ether layer was separated, dried over anhydrous sodium sulfate and the ether was removed by distillation. The residual oil was distilled under reduced pressure to give an 81 percent yield of o-benzyloxybenzaldehyde boiling at 147–148 degrees centigrade at a pressure of 0.05 millimeter of mercury; $n_D^{20}=1.6005$. The distillate crystallized spontaneously and was recrystallized from ethanol to yield o-benzyloxybenzaldehyde melting at 46–48 degrees centigrade.

PREPARATION 2
o-Isopropoxybenzaldehyde

From 23 grams (1.0 mole) of sodium, 500 milliliters of absolute ethanol, 122 grams (1.0 mole) of salicylaldehyde and 170 grams (1.0 mole) of isopropyl iodide, following the procedure described in Preparation 1, a 47 percent yield was obtained of o-isopropoxybenzaldehyde boiling at 118–121.5 degrees centigrade at a pressure of thirteen millimeters of mercury; $n_D^{20}=1.5308$. The semicarbazone, which was prepared according to the procedure described by Shriner and Fuson ("Identification of Organic Compounds," 2nd edition, p. 142, John Wiley and Sons, New York, 1940), melted at 178–180 degrees centigrade.

*Analysis.*—Calcd. for $C_{11}H_{14}N_3O_2$: N, 18.99. Found: N, 18.95.

PREPARATION 3
o-n-Propoxybenzaldehyde

From 46 grams (2.0 moles) of sodium, 1000 milliliters of absolute ethanol, 244 grams (2.0 moles) of salicylaldehyde and 340 grams (2.0 moles) of propyl iodide, following the procedure described in Preparation 1, a 79 percent yield was obtained of o-n-propoxybenzaldehyde boiling at 131–132 degrees centigrade at a pressure of thirteen millimeters of mercury; $n_D^{20}=1.5330$. The semicarbazone melted at 176.5–177.5 degrees centigrade.

*Analysis.*—Calcd. for $C_{11}H_{14}N_3O_2$: N, 18.99. Found: N, 19.06.

PREPARATION 4
o-n-Hexoxybenzaldehyde

From 69 grams (3.0 moles) of sodium, 1500 milliliters of absolute ethanol, 369 grams (3.0 moles) of salicylaldehyde and 500 grams (3.0 moles) of n-hexyl bromide, following the procedure described in Preparation 1, a 56 percent yield was obtained of o-n-hexoxybenzaldehyde boiling at 170–173 degrees centigrade at a pressure of thirteen millimeters of mercury; $n_D^{20}=1.5185$. The semicarbazone melted at 169–171 degrees centigrade.

*Analysis.*—Calcd. for $C_{14}H_{20}N_3O_2$: N, 15.96. Found: N, 15.90.

PREPARATION 5
o-Benzyloxyphenylacetone

In an apparatus equipped with a water take-off a mixture of 170 grams (0.8 mole) of o-benzyloxybenzaldehyde, 72 grams (0.96 mole) of nitroethane, 15 milliliters of n-butylamine and 400 milliliters of toluene was heated under reflux for about sixteen hours, or until the theoretical amount of water was removed. To the mixture was added 500 milliliters of water, 4 grams of ferric chloride and 200 grams of 80-mesh iron powder. The mixture was heated to boiling and to it was added drop-wise 360 milliliters of concentrated hydrochloric acid with efficient stirring over a period of about two hours. When the addition was complete, heating under reflux was continued for about thirty minutes. The mixture was filtered through "Super Cel" and the latter was washed with benzene. The organic layer in the filtrate was separated and the solvents were removed by distillation under reduced pressure on a steam bath. The residual oil was dissolved in 250 milliliters of ether and the solution was stirred vigorously for about an hour with a saturated solution of sodium bisulfite. The ether layer was separated, dried over anhydrous sodium sulfate and the ether was removed by distillation. The residual oil was distilled under reduced pressure to give a 38 percent yield of o-benzyloxyphenylacetone boiling at 155–160 degrees centigrade at a pressure of 0.25 millimeter of mercury; $n_D^{20}=1.5710$. The semicarbazone melted at 167–169 degrees centigrade.

*Analysis.*—Calcd. for $C_{17}H_{19}N_3O_2$: N, 14.13. Found: N, 14.01.

PREPARATION 6
o-Isopropoxyphenylacetone

From 131 grams (0.8 mole) of o-isopropoxybenzaldehyde, 72 grams (0.96 mole) of nitroethane, 15 milliliters of n-butylamine and 400 milliliters of toluene following essentially the procedure described in Preparation 5 a 60 percent yield was obtained of o-isopropoxyphenylacetone boiling at 133–135 degrees centigrade at a pressure of thirteen millimeters of merury; $n_D^{20}=1.5070$. In the isolation of this ketone a modification was made in the above procedure. Instead of the filtration thru Super Cel the reaction mixture was subjected to steam distillation until both solvent and product had distilled completely. Otherwise the procedure was identical to that described. The semicarbazone of o-isopropoxyphenylacetone melted at 152–4 degrees centigrade.

*Analysis.*—Calcd. for $C_{13}H_{19}N_3O_2$: N, 16.85. Found: N, 16.88.

PREPARATION 7
o-n-Propoxyphenylacetone

From 142 grams (0.87 mole) of o-n-propoxybenzaldehyde, 78.3 grams (1.04 moles) of nitroethane, 16 milliliters of n-butylamine and 400 milliliters of toluene following the modified procedure described in Preparation 6 a 47 percent yield was obtained of o-n-propoxyphenylacetone boiling at 132–135 degrees centigrade at a pressure of thirteen millimeters of mercury; $n_D^{20}=1.5162$. The semicarbazone melted at 138–141 degrees centigrade.

*Analysis.*—Calcd. for $C_{13}H_{19}N_3O_2$: N, 16.85. Found: N, 17.23.

PREPARATION 8
o-n-Hexoxyphenylacetone

According to the procedure described in Preparation 5 from 345 grams (1.67 moles) of o-n-hexoxybenzaldehyde, 150 grams (2.0 moles) of nitroethane, 30 milliliters of n-butylamine and 600 milliliters of toluene followed by treatment of the mixture with 1065 milliliters of water, 425 grams of 80-mesh iron powder, 8.5 grams of ferric chloride and 765 milliliters of concentrated hydrochloric acid a 39 percent yield was obtained of o-n-hexoxyphenylacetone boiling at 124–127 degrees centigrade at a pressure of 0.04 millimeter of mercury; $n_D^{20}1.5033$. The semicarbazone melted at 113–115 degrees centigrade.

*Analysis.*—Calcd. for $C_{16}H_{25}N_3O_2$: N, 14.42. Found: N, 14.54.

Other ortho-hydrocarbonoxyphenylacetones which can be prepared in the same manner as given in the preceding preparations by reacting a chosen ortho-hydrocarbonoxybenzaldehyde and nitroethane in the presence of a basic condensation catalyst include ortho-ethoxyphenylacetone, ortho - n - butoxyphenylacetone, ortho-isobutoxyphenylacetone, ortho - sec. butoxyphenylacetone, ortho - tert. butoxyphenylacetone, ortho - n - amyloxyphenylacetone, ortho - isoamyloxyphenylacetone, ortho - sec. amyloxyphenylacetone, ortho-activeamyloxyphenylacetone, ortho-(1 - methyl)pentanoxyphenylacetone, ortho-(2-ethyl)butanoxyphenylacetone, ortho-(2-methyl) pentanoxyphenylacetone, ortho-cyclopentanoxyphenylacetone, ortho-cyclohexanoxyphenylacetone, ortho-phenoxyphenylacetone and the like.

EXAMPLE 1

*Preparation of bis [β-(ortho-methoxyphenyl)isopropyl] amines*

A solution of 82.5 grams (0.5 mole) of ortho-methoxyphenylisopropyl amine and 82.0 grams (0.5 mole) of ortho-methoxyphenylacetone in 200 milliliters of absolute methanol was hydrogenated in a Parr hydrogenation apparatus at room temperature under a hydrogen pressure of 45 p.s.i. using 0.5 gram of Adams' platinum oxide catalyst until hydrogenation was complete, which required about five hours. The reaction mixture was warmed and the catalyst removed by filtration and the methanol removed by distillation. Upon fractional distillation of the residual oil there was obtained 116 grams of a mixture of the meso and racemic modification of bis [β-(ortho-methoxyphenyl)isopropyl]amine distilling at about 200 degrees centigrade at a pressure of 3.0 millimeters of mercury, which had an index of refraction $n_D^{20}$ of 1.5500.

The meso and racemic modifications were separated by means of the methanol complex.

EXAMPLE 2

*Preparation from ortho-methoxyphenylacetone and ammonia*

A solution of 492 grams (3.0 moles) of ortho-methoxyphenylacetone and 28 grams (1.65 mole) of ammonia in 900 milliliters of methanol was placed in an autoclave and hydrogenated at room temperature under a hydrogen pressure of about 50 p.s.i. using 3.0 grams of platinum oxide catalyst until absorption of hydrogen had ceased, which required about ten hours. The reaction mixture was warmed and the catalyst was removed by filtration. This methanol solution containing the racemic and meso bis [β-(ortho-methoxyphenyl)isopropyl]amines was used below for separation into the pure racemic and meso forms.

EXAMPLE 3

*Isolation of the bis [β-(ortho-methoxyphenyl) isopropyl] amine forming an insoluble methanol complex and salts thereof*

The filtrate obtained in Example 2 after removal of the catalyst was evaporated to a volume of about one liter and cooled to about five degrees centigrade for about sixteen hours. The solid, crystalline material which had separated was removed by filtration and so long as it was damp with methanol it remained solid. (When a portion was allowed to stand exposed to air the methanol evaporated and the solid changed to liquid.) The filtrate thus obtained was saved and further treated as described in Example 4.

The solid methanol complex, obtained above, was dissolved in ether and to the solution ice and water were added. A ten percent solution of hydrochloric acid in water was added portionwise, with vigorous stirring, to the mixture until it was acid to Congo red test paper. The resulting amine hydrochloride separated as a solid precipitate which was collected, washed with ice water and dried. There was thus obtained 185 grams of a bis [β - (ortho-methoxyphenyl)isopropyl]amine hydrochloride which melted at 244.5 to 245.0 degrees centigrade. Several crystallizations from isopropanol raised the melting point to 254–255 degrees centigrade.

*Analysis.*—Calcd. for $C_{20}H_{28}ClNO_2$: C, 68.65; H, 8.06; Cl, 10.13; N, 4.00. Found: C, 68.68; H, 7.90; Cl, 9.83; N, 4.25.

A portion of the above amine hydrochloride was suspended in water and converted to the free amine by the addition, with stirring of sodium hydroxide solution. The amine was extracted with benzene, the solution washed with water and the benzene removed by distillation. The residual water-free amine was dissolved in two parts of isopropanol and to this solution was added a slight excess of 85 percent lactic acid dissolved in two parts of isopropanol. The mixture, which became warm due to the heat of neutralization, was cooled and the bis[β-(orthomethoxyphenyl)isopropyl]amine lactate which precipitated was collected and after crystallization from isopropanol melted at 156.5–157 degrees centigrade. At about 25 degrees centigrade this lactate is soluble in water to the extent of about 1.75 percent.

*Analysis.*—Calcd. for $C_{23}H_{33}NO_5$: C, 68.46; H, 8.24; N, 3.47. Found: C, 68.51; H, 8.21; N, 3.67.

In a like manner the amine hydrochloride above was converted to the free amine from which the following salts were prepared by means of an isopropanol solution of the appropriate acid.

| Salt | Melting Point, degrees centigrade | Water Solubility, percent |
|---|---|---|
| Nicotinate | 156–158 | 0.48 |
| Nitrate | 168–169 | 0.08 |
| Acetylsalicylate | 110–111 | 0.25 |
| Glycolate | 166.5–167 | 1.44 |

EXAMPLE 4

*Isolation of the methanol soluble complex of bis [β-(orthomethoxyphenyl)isopropyl]amine and salts thereof*

The filtrate obtained in Example 3 after separation of the methanol insoluble amine complex was concentrated to give 280 grams of an oil which was fractionally distilled under a pressure of 0.1 millimeter of mercury. The first fraction which distilled at 93–110 degrees centigrade weighed 85 grams and had an index of refraction of $n_D^{20}$ of 1.5313 and consisted in part of a mixture of unreacted ortho-methoxyphenylacetone and some ortho-methoxyphenylisopropyl amine. The second fraction distilling at 194–196 degrees weighed 171 grams and had an index of refraction $n_D^{20}$ of 1.5510. This fraction, which still contains some of the isomer of Example 3, was dissolved in 500 milliliters of eighty percent aqueous methanol and cooled, a further quantity of insoluble methanol complex separating which after filtering off weighed 29 grams while still damp with methanol.

The methanol and most of the water were removed from the filtrate and the residual oil dried by adding benzene to it and distilling off the benzene. The dry amine thus obtained was dissolved in ether and to it was added ethereal hydrogen chloride until the entire solution was slightly acid. Crystals of amine hydrochloride separated and after cooling the mixture to insure complete precipitation the solid amine hydrochloride was collected, washed with ether and after drying weighed 137 grams. This solid hydrochloride was suspended in three liters of boiling isopropanol and filtered from the undissolved material while hot, which removed 26 grams of the amine hydrochloride of Example 3 melting at 243–246 degrees centigrade. The filtrate was cooled somewhat, two liters of ether were added and the solution cooled to about ten degrees centigrade. The crystalline hydrochloride which separated was collected and after drying weighed 103 grams and melted at 199.5–204 degrees centigrade. A portion of this material was again extracted with boiling isopropanol and after the addition of ether a bis [β-(ortho-methoxyphenyl)isopropyl] amine hydrochloride melting at 202.5–205 degrees centigrade was obtained.

*Analysis.*—Calcd. for $C_{20}H_{28}ClNO_2$: Cl, 10.13. Found: Cl, 10.01, 10.26.

A hydrochloride having an improved purity was obtained by dissolving the lactate (prepared below) in water and adding sodium chloride to the solution. The bis[β-(ortho - methoxyphenyl)isopropyl]amine hydrochloride thus obtained melted at 214–215 degrees centigrade. It was soluble in water to the extent of about 0.5 percent.

*Analysis.*—Calcd. for $C_{20}H_{28}ClNO_2$: C, 68.65; H, 8.06; N, 4.00. Found: C, 68.46; H, 8.00; N, 3.97.

The remainder of the amine hydrochloride above melting at 199.5–204 degrees was suspended in water and converted to the free amine by the addition, with stirring, of sodium hydroxide solution. The amine was extracted with benzene and the benzene removed by distillation. The dry amine thus obtained was dissolved in anhydrous ether and to this solution was added dropwise with stirring a solution of the calculated amount of lactic acid in ether (prepared by dissolving 85 percent lactic acid in ether, drying the solution with magnesium sulfate and filtering). The amine lactate crystallized slowly so the solution was cooled to five degrees centigrade for two days to insure complete precipitation. The precipitate of bis[β-(ortho-mehoxyphenyl)isopropyl]amine lactate was collected and after drying weighed ninety grams and melted at 139–141.5 degrees centigrade. Crystallization from either isopropanolether or methyl ethyl ketone raised the melting point to 140.5–142 degrees of centigrade.

*Analysis.*—Calcd. for $C_{23}H_{33}O_5N$: C, 8.46; H, 8.24; N, 3.47. Found: C, 68.35; H, 8.40; N, 3.45.

This lactate is soluble in water in the amount of about five percent. When converted to the hydrochloride by the addition of NaCl to its aqueous solution a hydrochloride melting at 214–215 degrees centigrade was obtained. The free base obtained from the lactate had a density at 27 degrees centigrade of 1.0234 and an index of refraction $n_D^{20}$ of 1.5490.

EXAMPLE 5

*Preparation of insoluble alcohol complexes*

The amine hydrochloride melting at 254–255 degrees centigrade, described in Example 3, was converted to the free base by adding the hydrochloride to a solution of sodium hydroxide in water. The amine was extracted with benzene, the benzene solution washed with water and the solvent removed by distillation. One part of the amine thus obtained was added to five parts of the selected alcohol and the solution cooled with the results as shown in the following table:

TABLE

| Alcohol | Solubility |
|---|---|
| 1. Methanol | Crystals at once at 25° C. Relatively insoluble in excess alcohol. |
| 2. Ethanol | Same as methanol. |
| 3. n-Propanol | Do. |
| 4. iso-Propanol | Do. |
| 5. n-Butanol | Do. |
| 6. tertiary Butanol | Solution clear at 25° C. Crystalline precipitate probably alcohol at zero. |
| 7. Iso-Amyl alcohol | Solution clear at 25° C. Crystalline precipitate at 5° C. |
| 8. sec. Amyl alcohol | Same as iso-amyl alcohol. |
| 9. 2-Methoxethanol | Do. |
| 10. tert. Amyl alcohol | No crystals at 5° C. |
| 11. 2-Butoxyethanol | Do. |
| 12. Pyrrolidine ethanol | No crystals. |
| 13. Ethylene glycol | Same as methanol. |
| 14. Propylene glycol | Do. |
| 15. Cyclohexanol | Do. |
| 16. "Carbitol" | Do. |

EXAMPLE 6

*Alcohol soluble complexes*

One part of the free amine obtained in Example 4 was dissolved in one part of the designated alcohol at room temperature and the solution cooled to five degrees centigrade with the results indicated in the following table:

TABLE

| Alcohol | Solubility |
|---|---|
| 1. Methanol | Crystals at 5° C. dissolved on addition of 4 parts of alcohol. |
| 2. Ethanol | Same as methanol. |
| 3. Cyclohexanol | Do. |
| 4. n-Propanol | Do. |
| 5. iso-Propanol | Do. |
| 6. n-Butanol | Do. |
| 7. Ethylene glycol | Do. |
| 8. Propylene glycol | Do. |
| 9. iso-Amyl alcohol | No precipitate. |
| 10. sec. Amyl alcohol | Do. |
| 11. 2-Methoxyethanol | Do. |
| 12. 2-Butoxyethanol | Do. |

EXAMPLE 7

*Bis[β-(o-benzyloxyphenyl)isopropyl]amine and salts thereof*

A solution of 0.85 gram (0.05 mole) of ammonia in 7.8 milliliters of methanol was added to a mixture of 24 grams (0.1 mole) of o-benzyloxyphenylacetone and 0.1 gram of platinum oxide in 160 milliliters of methanol. The resulting mixture was subjected to hydrogenation under about three atmospheres pressure for about 48 hours or until the theoretical amount of hydrogen had been consumed. The catalyst was removed by filtration and the solvent was removed by distillation under reduced pressure to yield the crude bis[β-(o-benzyloxyphenyl)isopropyl]amine as a viscous liquid which, because of its high boiling point, was isolated preferably in the form of one of its salts.

To a benzene solution of the amine as obtained above was added excess dilute hydrochloric acid. The white solid which separated was isolated by filtration and recrystallized from ten parts of methanol to yield the hydrochloride of bis[β-(o-benzyloxyphenyl)isopropyl]amine which melted at 236–238 degrees centigrade.

*Analysis.*—Calcd. for $C_{32}H_{36}NO_2Cl$: C, 76.55; H, 7.23; N, 2.79; Cl, 7.06. Found: C, 76.61; H, 7.35; N, 2.90; Cl, 7.07.

To an ether solution of the amine as obtained above was added a slight excess of fifty percent hypophosphorous acid and the mixture was shaken mechanically for about thirty minutes. The white solid which separated was isolated by filtration and recrystallized from isopropanolmethanol and from ethanol to yield the hypophosphite of bis[β-(o-benzyloxyphenyl)isopropyl]amine which melted at 196–200 degrees centigrade.

*Analysis.*—Calcd. for $C_{32}H_{38}NO_4P$: C, 72.30; H, 7.21; N, 2.64. Found: C, 72.74; H, 7.18; N, 2.83.

To an ether solution of the amine as obtained above was added an ether solution of lactic acid containing about a 25 percent excess of the acid. The white solid which separated was isolated by filtration and recrysalized from isopropanol to yield the lactate of bis[β-(o-benzyloxyphenyl)isopropyl]amine which melted at 126–128 degrees centigrade.

*Analysis.*—Cald. for $C_{35}H_{41}NO_5$: C, 75.65; H, 7.44; N, 2.52. Found: C, 75.28; H, 7.48; N, 2.46.

EXAMPLE 8

*Bis[β-(o-isopropoxyphenyl)isopropyl]amine and salts thereof*

According to the procedure described in Example 7 bis[β-(o-isopropoxyphenyl)isopropyl]amine was obtained by the reductive amination of 38.5 grams (0.2 mole) of o-isopropoxyphenylacetone with 1.7 grams (0.1 mole) of ammonia in the presence of 0.2 gram of platinum oxide.

Addition of dilute hydrochloric acid to a benzene solution of the amine did not precipitate the hydrochloride of the amine and the mixture was evaporated to dryness under reduced pressure. The gummy residue was crystallized from isopropanol to yield the hydrochloride of bis-[β-(o-isopropoxyphenyl)isopropyl]amine as a white solid which melted at 193–194 degrees centigrade.

*Analysis.*—Calcd. for $C_{24}H_{36}NO_2Cl$: C, 71.00; H, 8.94; N, 3.45; Cl, 8.74. Found: C, 70.91; H, 9.10; N, 3.59; Cl, 8.72.

Treatment of the hydrochloride with sodium hydroxide solution and distillation of the liberated amine under reduced pressure gave bis[β-(o-isopropoxyphenyl)isopropyl]amine as a colorless oil which boiled at 138–140 degrees centigrade at a pressure of 0.03 millimeter of mercury.

The lactate of bis[β-(o-isopropoxyphenyl)isopropyl]amine, which was prepared according to the procedure described in Example 4, melted at 113–115 degrees centigrade.

*Analysis.*—Calcd. for $C_{27}H_{41}NO_5$: C, 70.55; H, 8.99; N, 3.04. Found: C, 70.49; H, 8.89; N, 3.05.

EXAMPLE 9

*Bis[β-(o-n-propoxyphenyl)isopropyl]amine and salts thereof*

According to the procedure described in Example 7 bis[β-(o-n-propoxyphenyl)isopropyl]amine was obtained by the reductive amination of 77 grams (0.4 mole) of o-n-propoxyphenylacetone with 3.4 grams (0.2 mole) of ammonia in the presence of 0.4 gram of platinum oxide.

To a benzene solution of the amine was added excess dilute hydrochloric acid. The white solid which separated was isolated by filtration and recrystallized from isopropanol to yield the hydrochloride of bis [β-(o-n-propoxyphenyl)isopropyl]amine which melted at 185–186 degrees centigrade.

*Analysis.*—Calcd. for $C_{24}H_{36}NO_2Cl$: C, 71.00; H, 8.94; N, 3.45; Cl, 8.74. Found: C, 71.00; H, 9.25; N, 3.41; Cl, 8.72.

Treatment of the hydrochloride with sodium hydroxide solution and distillation of the liberated amine under reduced pressure gave bis[β-(o-n-propoxyphenyl)isopropyl]amine as an oil which boiled at 144.6 degrees centigrade at a pressure of 0.02 millimeter of mercury.

The lactate of bis[β-(o-n-propoxyphenyl)isopropyl]amine, which was prepared according to the procedure described in Example 4, melted at 145–147 degrees centigrade.

*Analysis.*—Calcd. for $C_{27}H_{41}O_5N$: C, 70.55; H, 8.99; N, 3.04. Found: C, 70.67; H, 8.97; N, 3.03.

EXAMPLE 10

*Bis[β-(o-n-hexoxyphenyl)isopropyl amine and salts thereof*

According to the procedure described in Example 7 bis[β-(o-n-hexoxyphenyl)isopropyl]amine was obtained as an oil which boiled at 216–219 degrees centigrade at a pressure of 0.03 millimeter of mercury by the reductive amination of 23.4 grams (0.1 mole) of o-n-hexoxyphenylacetone with 0.85 gram (0.05 mole) of ammonia in the presence of 0.1 gram of platinum oxide.

Addition of ethanolic hydrogen chloride to an ether solution of the base, evaporation of the mixture to dryness and recrystallization from ethyl acetate of the residual solid gave the hydrochloride of bis[β-(o-n-hexoxyphenyl)isopropyl]amine as a white solid which melted at 108–110 degrees centigrade.

*Analysis.*—Calcd. for $C_{30}H_{48}NO_2Cl$: C, 73.51; H, 9.87; N, 2.86. Found: C, 73.66; H, 9.73; N, 3.08.

Other bis[β-(ortho-hydrocarbonoxyphenyl)isopropyl]-amines which can be prepared in the same manner as given in the preceding examples by reducing a chosen ortho-hydrocarbonoxyphenyl acetone and ammonia, or reducing a chosen ortho-hydrocarbonoxyphenyl acetone and a chosen ortho-hydrocarbonoxyphenylisopropyl-amine, by means of hydrogen under pressure and a hydrogenation catalyst include bis[β-(o-ethoxyphenyl)isopropyl]amine, bis[β-(o-n-butoxyphenyl)isopropyl]amine, bis[β-(o-isobutoxyphenyl)isopropyl]amine, bis[β-(o-sec.-butoxyphenyl)isopropyl]amine, bis[β-(o-tert. butoxyphenyl)isopropyl]amine, bis[β-(o-n-amyloxyphenyl)isopropyl]amine, bis[β-(o-isoamyloxyphenyl)isopropyl]-amine, bis[β-(o-sec. amyloxyphenyl)isopropyl]amine, bis[β-(o-activeamyloxyphenyl)isopropyl]amine, bis [β-(o-(1-methyl)pentanoxyphenyl)isopropyl]amine, bis [β-(o-(2-methyl)pentanoxyphenyl)isopropyl]amine, bis[β-(o-cyclopentanoxyphenyl)isopropyl]amine, bis [β-(o-cyclohexanoxyphenyl)isopropyl]amine, bis[β-(o-phenoxyphenyl)isopropyl]amine and the like.

This is a continuation-in-part of application Serial No. 223,147, filed April 26, 1951, now Patent 2,647,929, issued August 4, 1953.

Having thus described my invention I claim:

1. As local anesthetic, sterile aqueous solution of an acid addition salt of an amine of the formula:

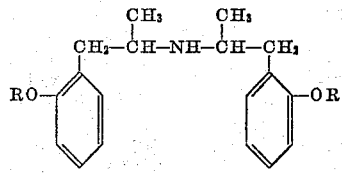

where R is a hydrocarbon radical free from unsaturation other than conjugated aromatic unsaturation and having from one to seven carbon atoms inclusive.

2. As local anesthetic, a sterile aqueous solution of an acid addition salt of bis [β-(ortho-methoxyphenyl)isopropyl]amine.

3. As a local anesthetic, a sterile aqueous solution of bis[β-(ortho-methoxyphenyl)isopropyl]amine lactate.

4. As a local anesthetic, a sterile aqueous solution of bis[β-(ortho-methoxyphenyl)isopropyl]amine hydrochloride.

References Cited in the file of this patent

UNITED STATES PATENTS

| | | |
|---|---|---|
| 2,276,619 | Kulz | Mar. 17, 1942 |
| 2,344,356 | Hildebrandt | Mar. 14, 1944 |

FOREIGN PATENTS

| | | |
|---|---|---|
| 617,647 | Germany | Aug. 23, 1935 |
| 623,593 | Germany | Jan. 2, 1936 |

OTHER REFERENCES

Kulz: Berichte, vol. 72 (1939), pp. 2161 to 2167.
Buth et al.: Berichte, vol. 72, page 27 (1939).